UNITED STATES PATENT OFFICE.

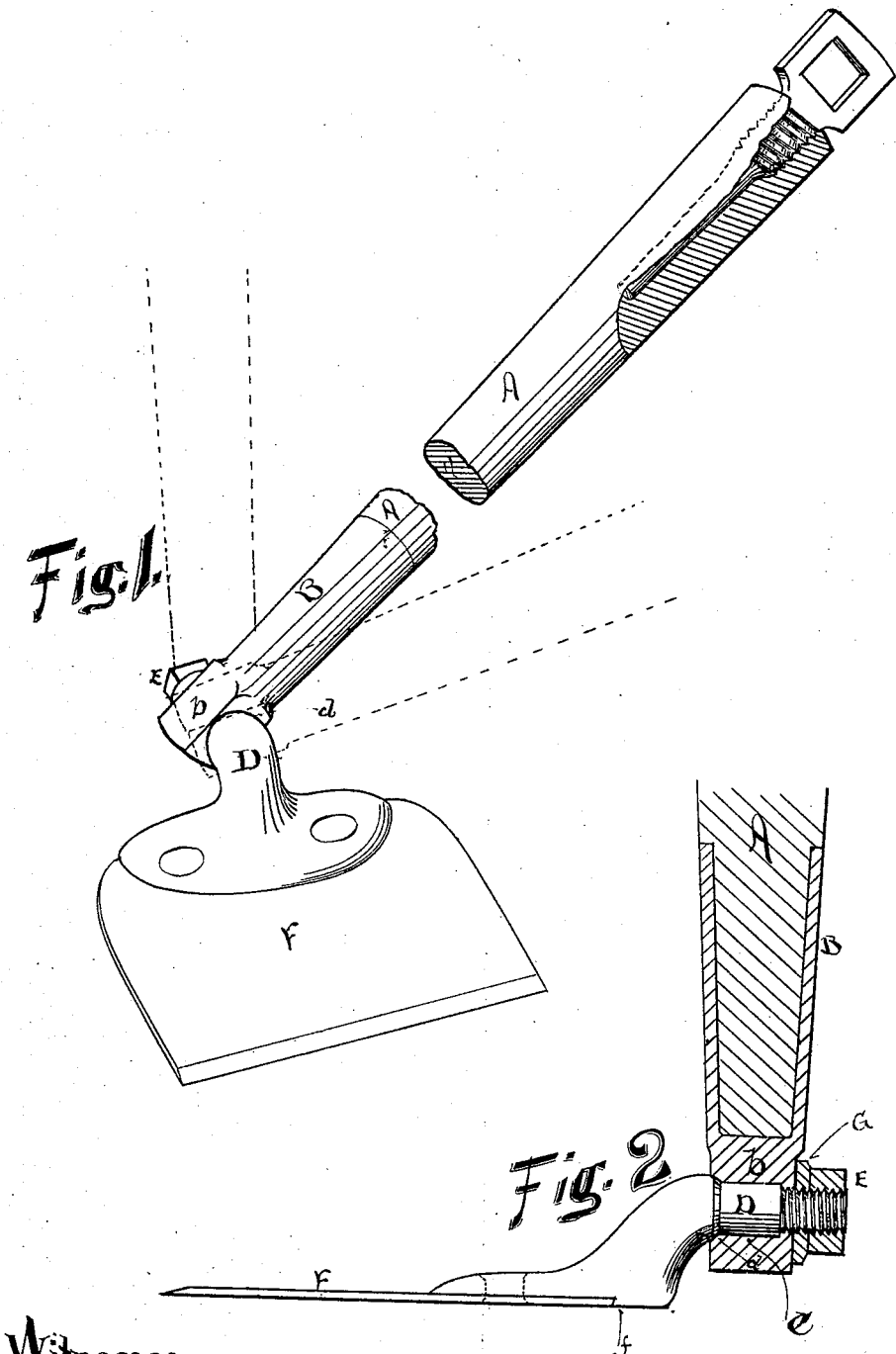

SUMNER F. STREETER, OF GREENFIELD, MASSACHUSETTS.

IMPROVEMENT IN TOOL-HANDLES.

Specification forming part of Letters Patent No. 145,252, dated December 2, 1873; application filed December 7, 1872.

*To all whom it may concern:*

Be it known that I, SUMNER F. STREETER, of Greenfield, in the county of Franklin and State of Massachusetts, have invented a new and useful Improvement in Tool-Handles; and I do hereby declare the following to be a full, clear, and exact description of the same, reference being had to the accompanying drawings.

My improvement relates to chopping-hatchets, which are employed in situations where it is inconvenient to place the hand in the plane in which the blade acts, as, for instance, in cutting up tobacco-stalks, cornstalks, trimming trees, hewing, &c.

I am aware that broad-axes are constructed with the head and eye oblique to the blade so as to set the handle "off" at one side or the other; but such tools are not susceptible of adjustment to adapt them to the hands of different workmen, or to cut right or left, as may be preferred.

My invention consists in attaching the blade to the handle by an adjustable connection, which will permit the blade to be fixed at any required angle oblique to the handle, so that it may be adapted to the particular work in which it may be, for the time being, employed, and may be used for hewing either right or left hand, or as an adz, as may be required.

That others may understand more fully the operation and mode of constructing my invention, I will particularly describe the construction of the same, which I prefer.

A is the handle, which may be of such shape and length as will best meet the requirements of the service to be performed. At the hatchet end I place a strong ferrule, B, upon the handle A, and secure it there by any adequate means. The ferrule B is provided with a solid and stout head, *b*, which has a cylindric or slightly-conical hole, C, through it to receive the shank D of the hatchet-blade. The shank D is cylindrical or conical to correspond with the hole or socket C, and is secured in any desired position therein by means of a screw-nut, E, which jams the head *b* against the shoulder *d* of the said shank. The shank D below the shoulder *d* may be bent, if preferred, so as to set the blade off from the handle, and I think it more convenient to so construct it. The blade may be formed solid with the shank, or, for instruments for common use, it may be preferable to make the blade of a sheet of steel, F, and rivet the same to the shank D, which will then be flattened and spread out, as shown in the drawings, for that purpose. When so constructed the shank D will be formed with a shoulder, *f*, against which the upper edge of the blade F will rest, and the rivets will then be relieved of the shearing strain which they would otherwise be required to sustain. When constructed in this way a broken or worn-out blade may be replaced by a new one without requiring much skill on the part of the workman; or the blade may be fastened to the shank with screws, which will enable the substitution of blades of different dimensions, or fresh ones, by any person. I am aware, however, that the manner of fastening blades to their shanks by means of screws, so as to permit the above-mentioned substitution, has been practiced heretofore.

To prevent any accidental turning of the shank D within its socket C, as might occur if the nut E should become loosened, a serrated washer, G, put on a square on the shank D, or connected thereto by a feather and spline, used under the nut E, or serrations may be formed on the shoulder *d* to engage with corresponding serrations in the surface of the head *b* may be employed with a like effect.

Having described my invention, what I claim as new is—

A chopping-hatchet composed of a handle, A, provided with a socket, C, and a blade, F, constructed with a shank, D, fitted to and secured in said socket, and adjustable therein so as to fix said blade parallel with, oblique, or transverse to said handle to cut either right or left handed, as and for the purpose set forth.

SUMNER F. STREETER.

Witnesses:
 AUSTIN DEWOLF,
 F. E. JONES.